M. W. WHATLEY.
Seed-Planter and Fertilizer-Distributer.
No. 223,421.    Patented Jan. 6, 1880.
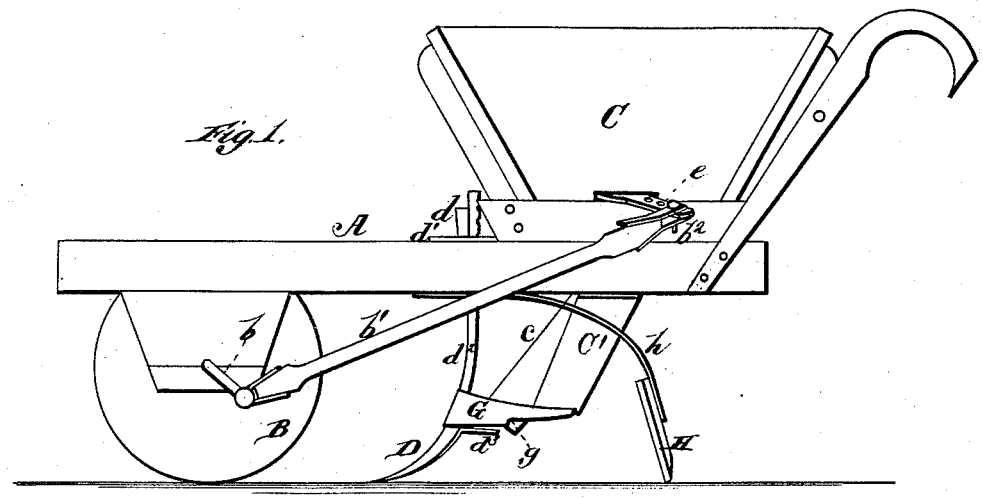
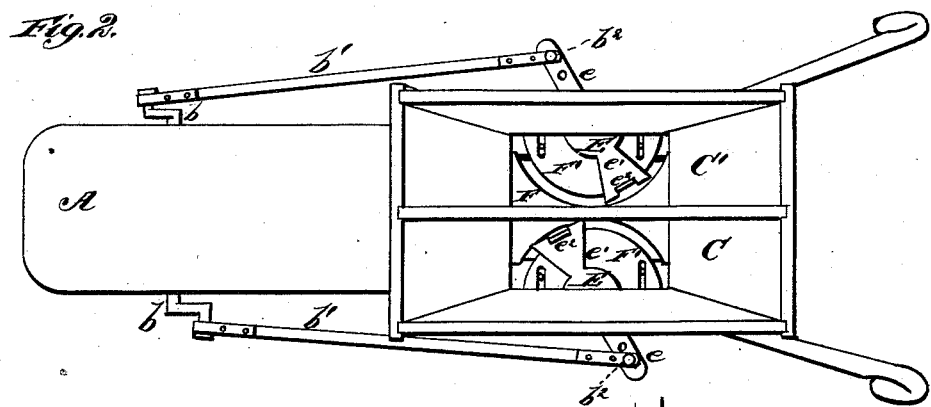
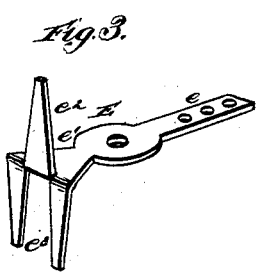
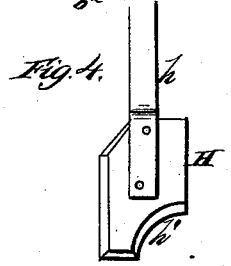

UNITED STATES PATENT OFFICE.

MARTIN W. WHATLEY, OF IDAHO, ALABAMA.

SEED-PLANTER AND FERTILIZER-DISTRIBUTER.

SPECIFICATION forming part of Letters Patent No. 223,421, dated January 6, 1880.

Application filed May 17, 1879.

*To all whom it may concern:*

Be it known that I, MARTIN W. WHATLEY, of Idaho, in the county of Clay and State of Alabama, have invented certain new and useful Improvements in a Seed-Planter and Fertilizer-Distributer; and I do hereby declare that the following is a full, clear, and exact description of the construction and operation of the same, reference being had to the annexed drawings, making a part of this specification, and to the letters and figures of reference marked thereon.

Figure 1 of the drawings is a representation of a side elevation of my seed-planter and fertilizer-distributer. Fig. 2 is a plan view. Fig. 3 is a perspective detail view of the agitator, and Fig. 4 is a detail view of one of the covering-blades.

Identical parts in the drawings are designated and referred to by the same letters.

My invention relates to seed-planters and fertilizer-distributers; and it consists in pronged agitators for agitating both the seed and the fertilizing substance in the body of the hoppers which carry the same, and at the same time play in the seed and fertilizer delivery in such a manner as to secure a proper delivery of the same; and it also consists in a plow or ground opening and agitating implement provided with cuffs and flanges so constructed and arranged as to provide for covering the fertilizer with earth, then deposit the seed, and then cover the seed; and it also consists in the general construction and arrangement of parts for carrying seed and fertilizing substance, and the mode of operating the distributers and regulating the distribution.

A is the body or beam of the planter. B is the driving-wheel of the mechanism. C is the hopper containing the seed and fertilizer. D is the plow, and $b\ b$ are cranks formed on the axle of the driving-wheel. $b'\ b'$ are rods or pitmen connecting these cranks with the arms $e$ of the agitators E, which are pivoted in the walls of the hopper, and the arms $e'$, which extend into the hopper, are provided with the vertical arms $e^2$ and $e^3$ for agitating and distributing the contents of the hopper.

The amount of motion to be given the agitator is regulated by giving the agitator more or less motion, which is done by changing the position of the pin $b^2$ in the series of holes in the arms $e$. The amount of distribution is also regulated by means of the sliding plates F'.

The bottom of the hopper is formed of a plate, F, cut concave upon the circle described by the arms $e^3$, and the sliding plates F' are cut upon the same circle, convex, to serve as a cut-off or feed-regulator. The arms $e^3$ do not pass below plate F.

C' is the hopper for the fertilizing substance, and $c$ is the spout conducting the same down to and immediately in rear of the plow.

The plow D can be set at any required depth by means of the wedge $d$ in the plate $d'$. $d^2$ is the curved standard of the plow, and $d^3$ are flanges or wings extending from the upper corners of the plow-blade rearward, to prevent the ground from closing in immediately behind the plow-blade.

G is a cuff or fender, which is attached to the plow-standard immediately above the plow-blade. This fender also extends rearward, and has the step or cut-away $g$, and is so formed that, in connection with the wings $d^3$, the ground raised by the plow first fully covers the fertilizing substance, and retains sufficient of the same to cover the seed, which is conducted from the seed-hopper C by the spout $c'$.

H are covering-blades, held in position by the springs $h$. These blades have cut-aways $h'$, and are set a little quartering to the plow, so as to cast the earth displaced by the plow back over the seed and fertilizing deposits.

By means of my invention I am enabled to deposit a regulated amount of fertilizing substance in the earth and cover it, and over the same deposit and cover a regulated amount of cotton or other seed, all at a regulated depth.

Having thus described my invention, what I claim as new, and desire to secure by Letters Patent, is—

1. In a seed-planter and fertilizer-distributer, the agitators E, provided with the arms $e\ e'\ e^2\ e^3$, constructed and arranged as and for the purposes substantially as set forth.

2. In a seed-planter and fertilizer-distributer, the cuff G, in combination with the plow-standard and lateral wings $d^3$, extending rearward from the upper corners of the same, as and for the purposes substantially as set forth.

3. In a seed-planter and fertilizer-distributer, the plates F F', forming a semicircular discharge-opening, in combination with the pivoted agitators E, having arms $e'$ $e^2$ $e^3$, as and for the purposes substantially as set forth.

4. In a seed-planter and fertilizer-distributer, the combination of the plow-blade D, provided with the wings $d^3$, with the cuff or fender G, cut-away $g$, and conductors $c$ $c'$, constructed and arranged as and for the purposes substantially as set forth.

In testimony that I claim the above I have hereunto subscribed my name in the presence of two witnesses.

MARTIN W. WHATLEY.

Witnesses:
T. J. BIRCKHEAD,
JAMES L. WILLIAMS.